United States Patent
Otsuka et al.

(10) Patent No.: US 6,729,214 B2
(45) Date of Patent: May 4, 2004

(54) TARGET SHAPE PORTION CUTTING APPARATUS, ROBOT EQUIPPED WITH THE APPARATUS AND TARGET SHAPE PORTION CUTTING METHOD

(75) Inventors: Kazuhisa Otsuka, Yamanashi (JP); Toshio Nakagawa, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 293 days.

(21) Appl. No.: 09/852,841

(22) Filed: May 11, 2001

(65) Prior Publication Data

US 2002/0005099 A1 Jan. 17, 2002

(30) Foreign Application Priority Data

May 11, 2000 (JP) ........................................ 2000-138003

(51) Int. Cl.$^7$ ................................................. B26D 1/20
(52) U.S. Cl. ............................... 83/56; 83/565; 83/694; 83/928
(58) Field of Search ................... 72/325, 326, 331; 83/13, 56, 916, 928, 565, 821, 694, 40; 30/134, 132, 135, 253, 254, 228, 241; 901/41

(56) References Cited

U.S. PATENT DOCUMENTS

| | | | | |
|---|---|---|---|---|
| 4,030,387 A | * | 6/1977 | Finnimore | 83/49 |
| 4,391,119 A | * | 7/1983 | Schmitz | 72/384 |
| 4,393,570 A | * | 7/1983 | Frick et al. | 29/560 |
| 4,416,176 A | * | 11/1983 | Forthmann | 83/582 |
| 4,506,573 A | * | 3/1985 | Tobita | 83/153 |
| 4,534,255 A | * | 8/1985 | Salvagnini | 83/530 |
| 4,535,665 A | * | 8/1985 | Fazis | 83/556 |
| 4,546,683 A | * | 10/1985 | Volkel et al. | 83/27 |
| 4,846,037 A | * | 7/1989 | Tobita et al. | 83/599 |
| 4,909,109 A | * | 3/1990 | Crane | 83/156 |
| 4,958,545 A | * | 9/1990 | Lenzotti | 83/559 |
| 4,981,058 A | * | 1/1991 | Gavrun, III | 83/34 |
| 5,027,505 A | * | 7/1991 | Nakamura et al. | 29/832 |
| 5,180,049 A | * | 1/1993 | Salvagnini | 198/699.1 |
| 5,377,519 A | * | 1/1995 | Hayashi | 72/326 |
| 5,538,591 A | * | 7/1996 | Collins et al. | 156/584 |
| 5,834,728 A | * | 11/1998 | Mauer et al. | 219/99 |
| 5,860,214 A | * | 1/1999 | Morikawa et al. | 30/134 |
| 5,913,468 A | * | 6/1999 | Tsai et al. | 225/103 |
| 5,992,023 A | * | 11/1999 | Sederberg et al. | 30/134 |
| 6,031,199 A | * | 2/2000 | Ream et al. | 219/121.63 |
| 6,115,922 A | * | 9/2000 | Kline | 30/229 |

FOREIGN PATENT DOCUMENTS

| | | |
|---|---|---|
| JP | 55-084232 | 6/1980 |
| JP | 59-082121 | 5/1984 |
| JP | 03-227827 | 10/1991 |
| JP | 04-266437 | 9/1992 |
| JP | 05-042331 | 2/1993 |

* cited by examiner

Primary Examiner—Allan N. Shoap
Assistant Examiner—Ghassem Alie
(74) Attorney, Agent, or Firm—Staas & Halsey LLP

(57) ABSTRACT

A metal sheet is formed with a target shape portion, a remaining portion surrounding the target shape portion and elongated portion(s) joining the target shape portion with the remaining portion. An apparatus cuts out the target shape portion from the metal sheet by shearing the joint portion at a region bordering on the target portion. The apparatus includes a blade member movable to a position below the joint portion and a fixed blade member for pressing the joint portion from above. The apparatus, being placed at a fixed position, rotates or linearly moves the movable blade member with respect to the fixed blade member to shear the joint portion at the region and bend a sheared-side end of the joint portion upward.

15 Claims, 11 Drawing Sheets

TARGET SHAPE PORTION CUTTING APPARATUS, ROBOT EQUIPPED WITH THE APPARATUS AND TARGET SHAPE PORTION CUTTING METHOD

BACKGROUND OF THE INVENTION

1. Field of the Invention

This invention relates to a target shape portion cutting apparatus and method of cutting out a target shape portion formed on a metal sheet from the remaining portion thereof, and a robot equipped with the target shape portion cutting apparatus.

2. Description of the Related Art

For cutting out a target shape portion from a metal sheet, the metal sheet is first worked so that the target shape portion, a portion surrounding the target shape portion (the surrounding portion being hereinafter called "base metal sheet") and at least one elongated joint portion for joining the former two portions are formed on the metal sheet, and then the joint portion is cut out, using:

(a) a method of mechanically applying an impact or vibration to a portion near the joint portion to thereby cause plastic deformation so that a link portion between the target shape portion and the base metal sheet is cut out;

(b) a method of cutting out the target shape portion by a finishing machine without leaving any joint portion, and drop the target shape portion on a conveyor or the like for collection of the target shape portion; or (c) a method of using a robot mounting a target shape portion cutting apparatus equipped with a scissors-like tool (nipper), which causes the tool to approach vertically to the joint portion between the target shape portion and the base metal sheet, from above, so that the blade of the tool abuts on the top surface of the joint portion to thereby snip off the joint portion in the plane direction.

Since the above method (a) applies an impact or vibration to the joint portion, burrs are produced on the portion where the target shape portion has been cut out. Therefore, post processing, such as burr removal, is therefore needed after separating the target shape portion. Further, since the position and posture of the target shape portion after separation are not stable, it is difficult for the robot to hold and take away the cut-out target shape portion. This makes it difficult to achieve automation of working metal sheets, remote manipulation of the robot and so forth.

The above method (b) likewise causes unstable position and posture of the target shape portion after it is cut out. Therefore, like the method (a), the method (b) makes it difficult for the robot to hold and take away the cut-out target shape portion. This makes it difficult to achieve automation of working metal sheets, remote manipulation of the robot and so forth.

Since the above method (c) cuts out the joint portion formed on the metal sheet by the tool, such as the nipper, a hole large enough for allowing the free end of the tool to enter has to be formed in an area around the joint portion of the metal sheet. Further, since the tool (nipper) moves in the widthwise direction of the joint portion to cut out the joint portion, a part of the joint portion remains on the cut-out target shape portion. Therefore this method requires post-processing for removing the remaining portion of the joint portion. Further, separation of the target shape portion cannot be confirmed based on only the tool movement.

Moreover, it is difficult to take out a cut-out target portion because a portion of the joint portion remaining on the target shape portion may interfere with a portion of the joint portion remaining on the base metal sheet when cutting out and taking out the target shape portion. In addition, as the free end of the tool goes through a tool insertion hole formed in the metal sheet and protrudes further below the bottom surface of the metal sheet when the target shape portion is cut out, the tool may cut the member which supports the metal sheet.

SUMMARY OF THE INVENTION

An object of the present invention is to provide a target shape portion cutting apparatus and method that are designed in such a manner that when a target shape portion formed on a metal sheet is cut out from the remaining portion of the metal sheet, the results of the separation require no post-processing and do not interrupt taking out of a cut-out target shape portion.

To achieve the abovementioned object, with a metal sheet which has been worked in such a way that a target shape is connected to a base metal through one or a plurality of joint portions by forming a hole at a region adjacent to the joint portion, a target shape portion cutting apparatus according to one aspect of the present invention comprises a first member having a first blade for pressing a boundary portion between the target shape portion and the joint portions of the perforated metal sheet from one face of the perforated metal sheet and from the side of the target shape portion; and a second member having a second blade which approaches the joint portion from the other face of the perforated metal sheet, grips the boundary portion in association with the first blade in a thickness direction of the perforated metal sheet and shears the perforated metal sheet at the boundary portion to thereby cut the target shape portion off a joint portion.

The second member having the second blade is supported in a manner such that it rotates relative to the first member having the first blade and is driven by a cylinder or a motor. Alternatively, the second member having the second blade is moved by a cylinder or a motor in the thickness direction of the perforated metal sheet relative to the first member having the first blade and cuts the target shape portion off a joint portion. The second member having the second blade is thick enough to be able to bend a joint portion by pushing it at the time of cutting out the target shape portion from the joint portion.

A robot may mount the target shape portion cutting apparatus to cut a target shape portion of a metal sheet off a joint portion which connects the target shape portion to a base metal sheet.

A method of cutting out a target shape portion from a base metal sheet using the robot comprises a step of placing a metal sheet having the target shape portion connected to the base metal sheet with one or a plurality of joint portions on a mounting section whose surface member is made of a soft material or a brush-like material soft enough to be able to keep a plane posture of the target shape portion and the base metal sheet; a step of pressing an exposed region of the mounting section with the second member having the second blade through a tool insertion hole formed adjacent to the target shape portion to be cut out; a step of moving the second blade under the joint portion to be cut out from the target shape portion while pressing the mounting section with the second member having the second blade; a step of pressing a boundary portion between the target shape portion and the joint portion with the first blade positioned above the joint portion, from the side of the target shape portion; and a step of moving the second blade upward to snip off the joint portion in association with the first blade.

BRIEF DESCRIPTION OF THE DRAWINGS

The foregoing and other objects and features of the invention will become apparent from the following description of preferred embodiments of the invention with reference to the accompanying drawings in which.

DETAILED DESCRIPTION OF THE PREFERRED EMBODIMENTS

A target shape portion cutting apparatus according to the first embodiment of the present invention will now be described with reference to FIGS. 1 through 9.

Figure 1:
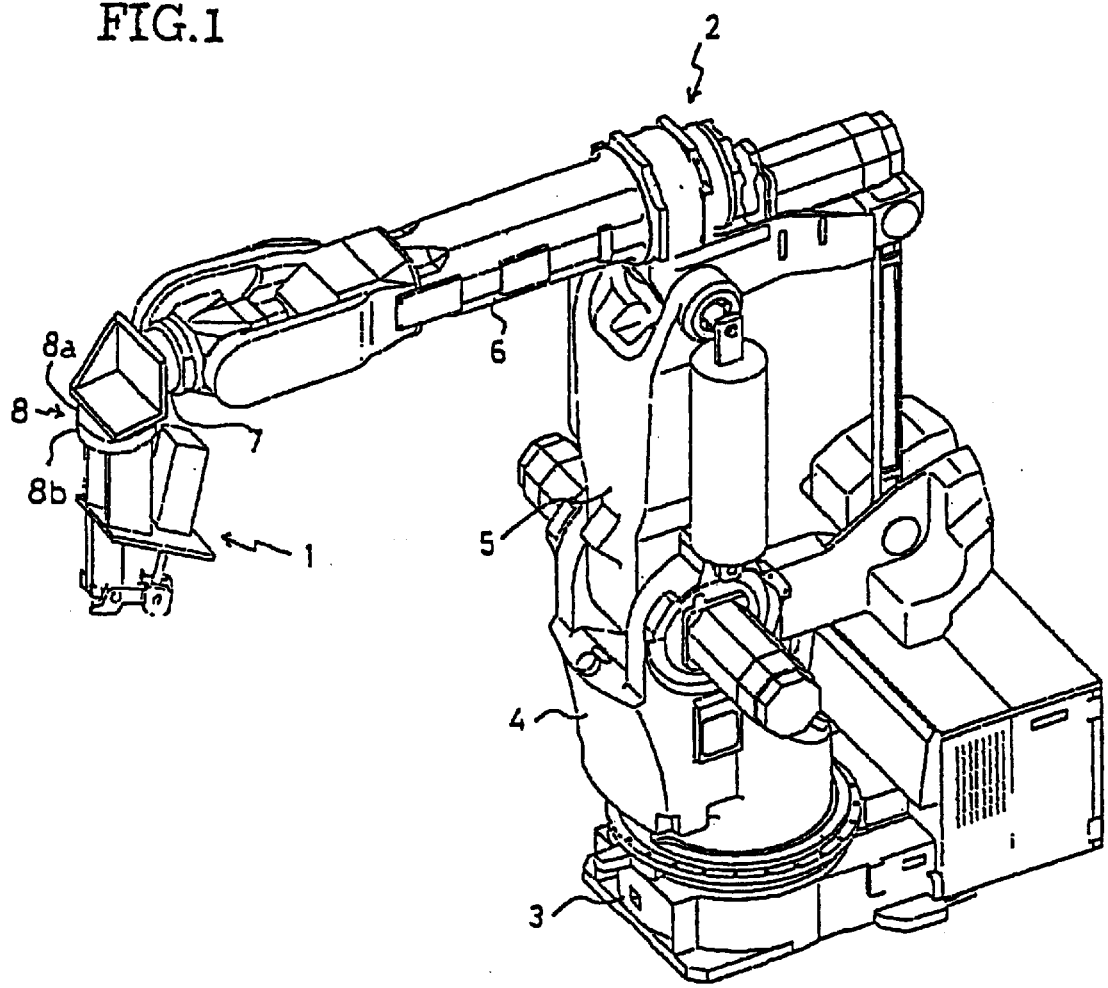
FIG. 1 is a perspective view exemplifying a robot mounting a target shape portion cutting apparatus according to a first embodiment of the present invention.

FIG. 1 exemplifies a robot 2 equipped with a target shape portion cutting apparatus 1 according to the embodiment. The robot 2 includes a rotary body 4 which rotates around the vertical axis with respect to a base 3, a first arm 5 mounted on the rotary body 4, a second arm 6 attached to the distal end of the first arm 5, and a wrist 7 connected to the distal end of the second arm 6. The first arm 5 turns around the horizontal axis. The second arm 6 likewise turns around the horizontal axis. The wrist 7 rotates around three axes perpendicular to one another.

The target shape portion cutting apparatus 1 is attached to the wrist 7 of the robot 2 via an automatic tool changer 8. The automatic tool changer 8 has a robot-side mounting member 8a to be attached to the flange surface of the wrist 7 and a tool-side mounting member 8b to be attached to the tool side (i.e., to the target shape portion cutting apparatus 1 in the embodiment). Various tools including the target shape portion cutting apparatus 1 may be attached to or detached from the wrist 7 of the robot 2 by connecting or disconnecting the robot-side mounting member 8a and the tool-side mounting member 8b of the automatic tool changer 8 to or from the flange surface of the wrist 7 and the tool attached to the wrist 7.

Figures 2A, 2B:
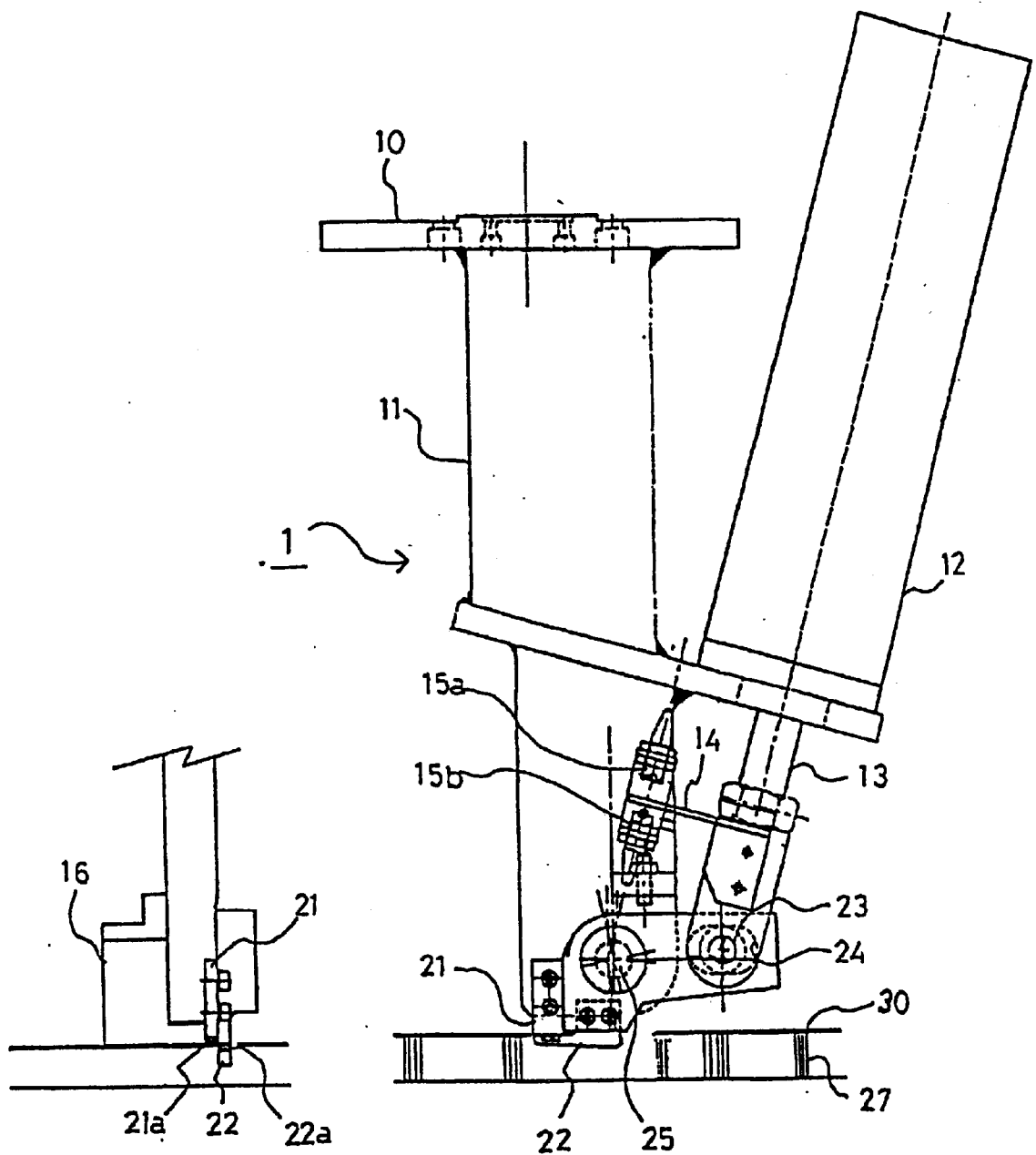
FIG. 2A is a side view of the target shape portion cutting apparatus in FIG. 1.
FIG. 2B is a partly enlarged view (front view) of the target shape portion cutting apparatus in FIG. 2A.

FIG. 2A is a side view of the target shape portion cutting apparatus 1, and FIG. 2B is a partial front view for explaining how to cut a joint portion between a target shape portion and a base metal sheet with the target shape portion cutting apparatus 1 in FIG. 2A.

The target shape portion cutting apparatus 1 has an attachment member 10 and a tool frame 11 secured to the attachment member 10. The attachment member 10 is used to attach the target shape portion cutting apparatus 1 to the automatic tool changer 8 shown in FIG. 1. A fixed blade member 21 having a first blade 21a (fixed cutting blade) is secured to the lower end of the tool frame 11. A pressing block 16 (FIG. 2B) which presses a target shape portion formed on a metal sheet from above is fixed to a side of the tool frame 11 opposite the side where the fixed blade member 21 is secured.

A movable blade member 22 having a second blade 22a (movable cutting blade) at one end thereof is rotatably attached to a pin 25 which protrudes from the side surface of the tool frame 11. As the second blade 22a rotates with respect to the first blade 21a, a joint portion which connects the target shape portion to the base metal sheet is cut to separate the target shape portion from the base metal sheet.

The first blade 21a and the second blade 22a, which are both super steel chips available on the market, are respectively mounted on the fixed blade member 21 and the movable blade member 22 in a replaceable manner. As will be discussed later, the movable blade member 22 is thick enough to be able to bend a portion near the cut surface of a joint portion when its second blade 22a turns and cuts the joint portion in association with the first blade 21a.

A drive cylinder 12 is attached to the tool frame 11. The drive cylinder 12 uses air pressure, hydraulic pressure or a drive source such as a motor or a servo motor. A pin 23 provided at the distal end of a rod 13 of the drive cylinder 12 is engaged with an elongated hole 24 formed in an end portion of the movable blade member 22 opposite the end where the second blade 22a is attached. Since the drive cylinder 12 is actuated, therefore, the movable blade member 22 rotates around the pin 25 so that the second blade 22a is closed with respect to the first blade 21a, thereby cutting a joint portion between the target shape portion and the base metal sheet, as will be discussed later.

A dog 14 is attached to the rod 13 of the drive cylinder 12. A pair of proximity switches 15a and 15b is attached to the tool frame 11 at positions above and below the dog 14. When the rod 13 moves downward and the second blade 22a is closed with respect to the first blade 21a, the dog 14 contacts the lower proximity switch 15b, indicating that the second blade 22a is closed with respect to the first blade 21a. When the rod 13 moves upward and the second blade 22a is open with respect to the first blade 21a, the dog 14 contacts the upper proximity switch 15a, indicating that the second blade 22a is open with respect to the first blade 21a.

A metal sheet 30 having a joint portion which is to be cut by the opening/closing action of the second blade 22a with respect to the first blade 21a is placed on a mounting section 27 as shown in FIG. 2A.

With reference to FIGS. 3 through 9, a description will now be given of an operation of shearing and cutting a joint portion between a target shape portion and a base metal sheet formed on a metal sheet using the target shape portion cutting apparatus 1.

Figure 3:
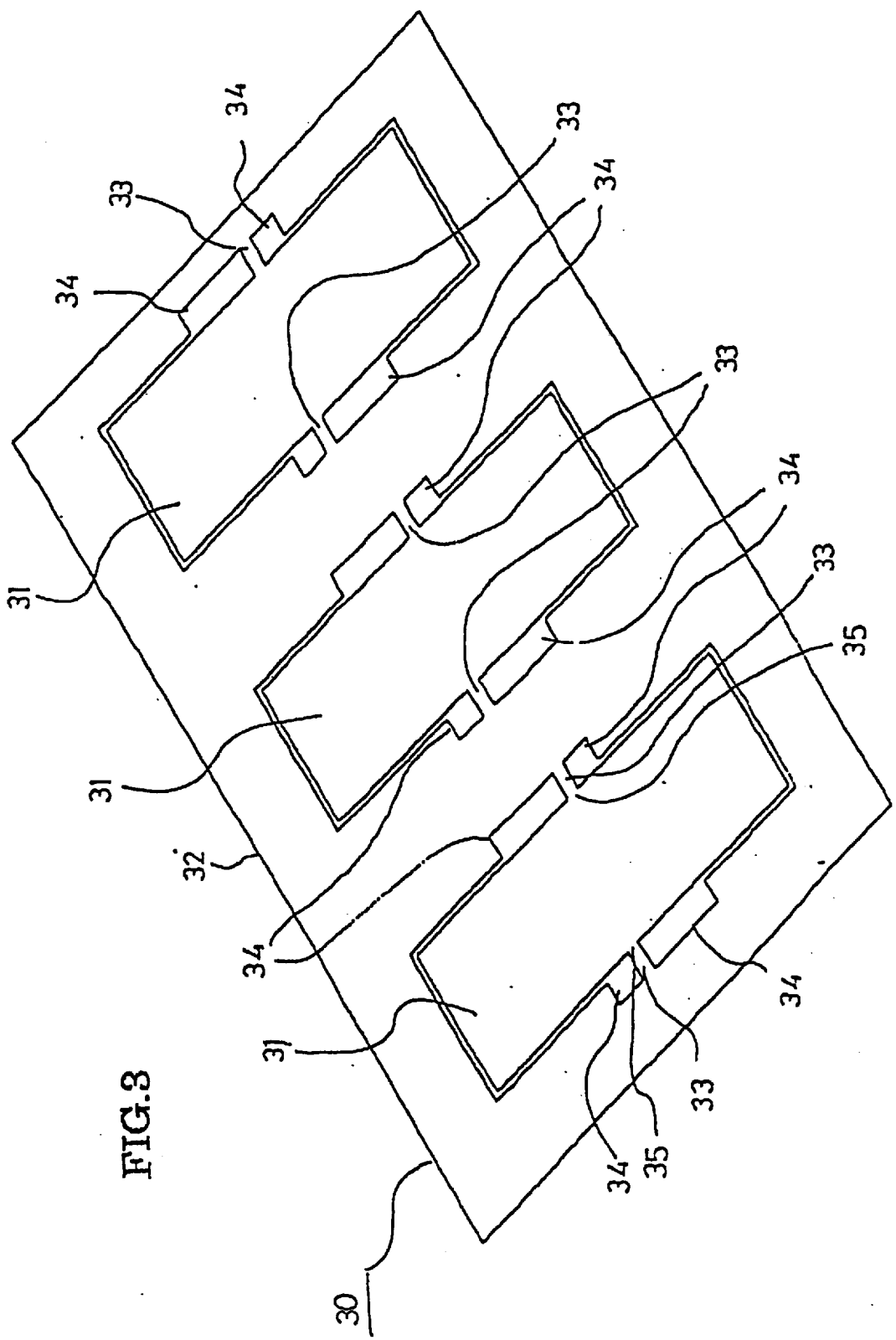
FIG. 3 is a diagram showing an example of a worked metal sheet in which a target shape portion formed is connected to a base metal sheet with joint portions.

As shown in FIG. 3, holes 34 are formed in right and left sides of each joint portion 33 between the target shape portion 31 and the base metal sheet 32 of a metal sheet 30. Each hole 34 has a predetermined width and a predetermined length where the movable blade member 22 is inserted. In the embodiment in FIG. 3, one target shape portion 31 is connected to the base metal sheet 32 with two joint portions 33. Reference numeral 35 denotes a boundary line between the target shape portion 31 and each joint portion 33. The joint portion 33 is cut along the boundary line 35 by the rotation of the second blade 22a with respect to the first blade 21a, as will be discussed later.

Figure 4:
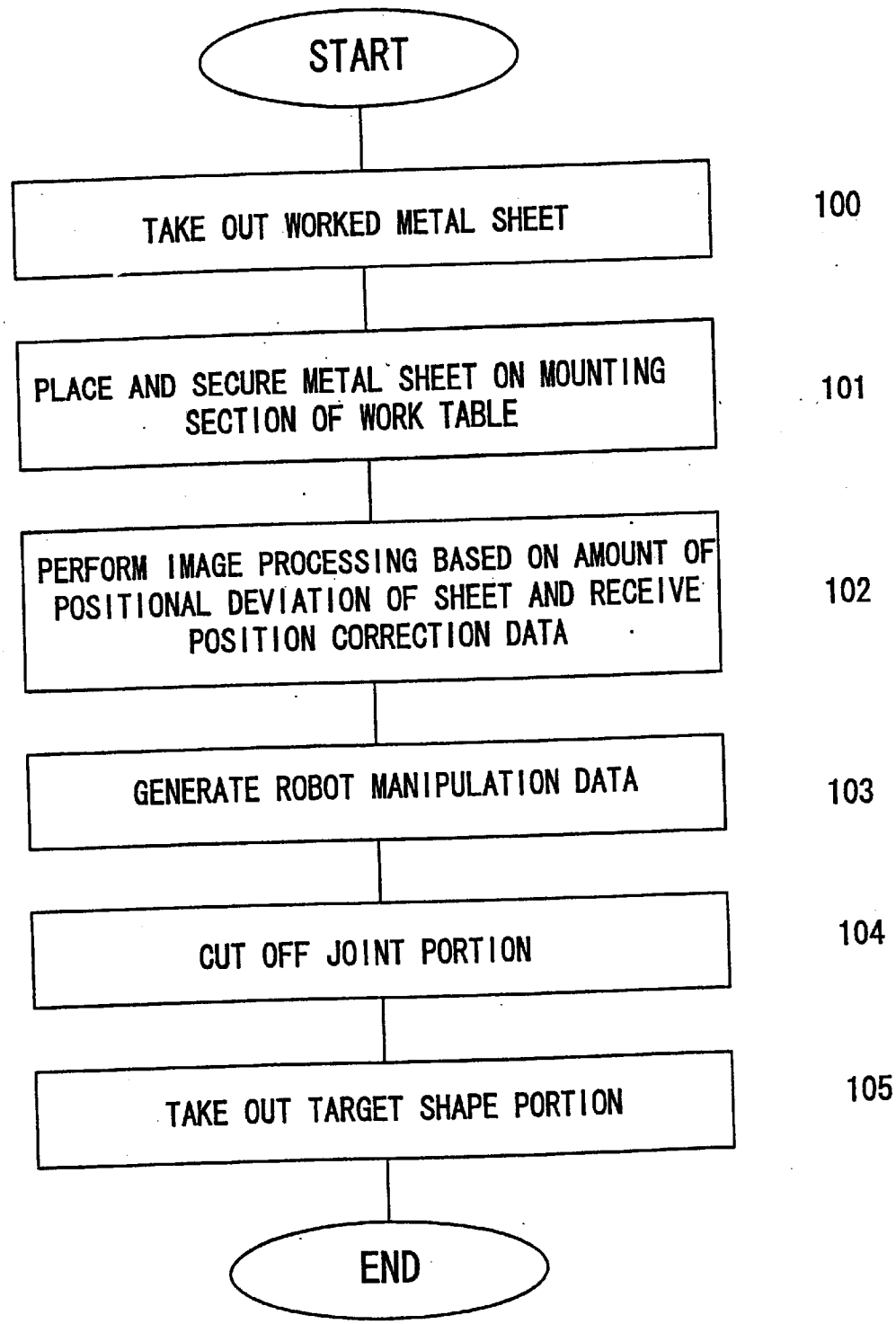
FIG. 4 is a diagram for explaining procedures of cutting out a target shape portion.

FIG. 4 illustrates procedures of cutting the joint portion 33 between the target shape portion 31 and the base metal sheet 32 in the metal sheet 30.

A metal sheet is worked into a shape as shown in FIG. 3 and the worked metal sheet 30 is picked up and taken out by the robot 2 and securely placed on the mounting section 27 of a work table (steps 100 and 101). The mounting section 27 is made of a material, such as a brush and sponge rubber, soft enough to be able to keep a plane posture of the metal sheet 30 as shown in FIG. 2A.

Next, the metal sheet 30 placed on the mounting section 27 is photographed with a camera (not shown) and the image is subjected to image processing in an image processor (not shown) to acquire the amount of positional deviation from the reference position of the metal sheet 30. Based on the amount of positional deviation, position correction data is acquired. A robot control apparatus receives the position correction data from the image processor (step 102). The robot control apparatus then obtains the shearing position (the boundary line 35 between the target shape portion 31 and the joint portion 33) based on the received position correction data to generate robot manipulation data (step 103).

Meanwhile, a tool for holding the metal sheet 30 is detached from the wrist 7 of the robot 2 using the automatic tool changer 8 and the target shape portion cutting apparatus 1 is attached to the wrist 7 as shown in FIG. 1.

Since the robot 2 is manipulated based on the robot manipulation data obtained in step 103, the target shape portion cutting apparatus 1 shears the joint portion 33 and cuts out the target shape portion 31 from the base metal sheet 32 (step 104). The details of the cutting operation will be given later.

Finally, the target shape portion cutting apparatus 1 is detached from the wrist 7 of the robot 2 and a tool for grasping the target shape portion 31 is attached to the wrist 7. Then, the tool holds the target shape portion 31 and takes the target shape portion out for placement at a predetermined position in a predetermined posture (step 105).

The above explanation is of the outline of the procedures for cutting out the target shape portion 31 from the worked metal sheet 30 and taking out the target shape portion 31.

Referring now to FIG. 2 and FIGS. 5 to 9, a detailed description will be given of the operation of cutting out a target shape portion by shearing the joint portion 33 in step 104 in FIG. 4.

Figure 5:
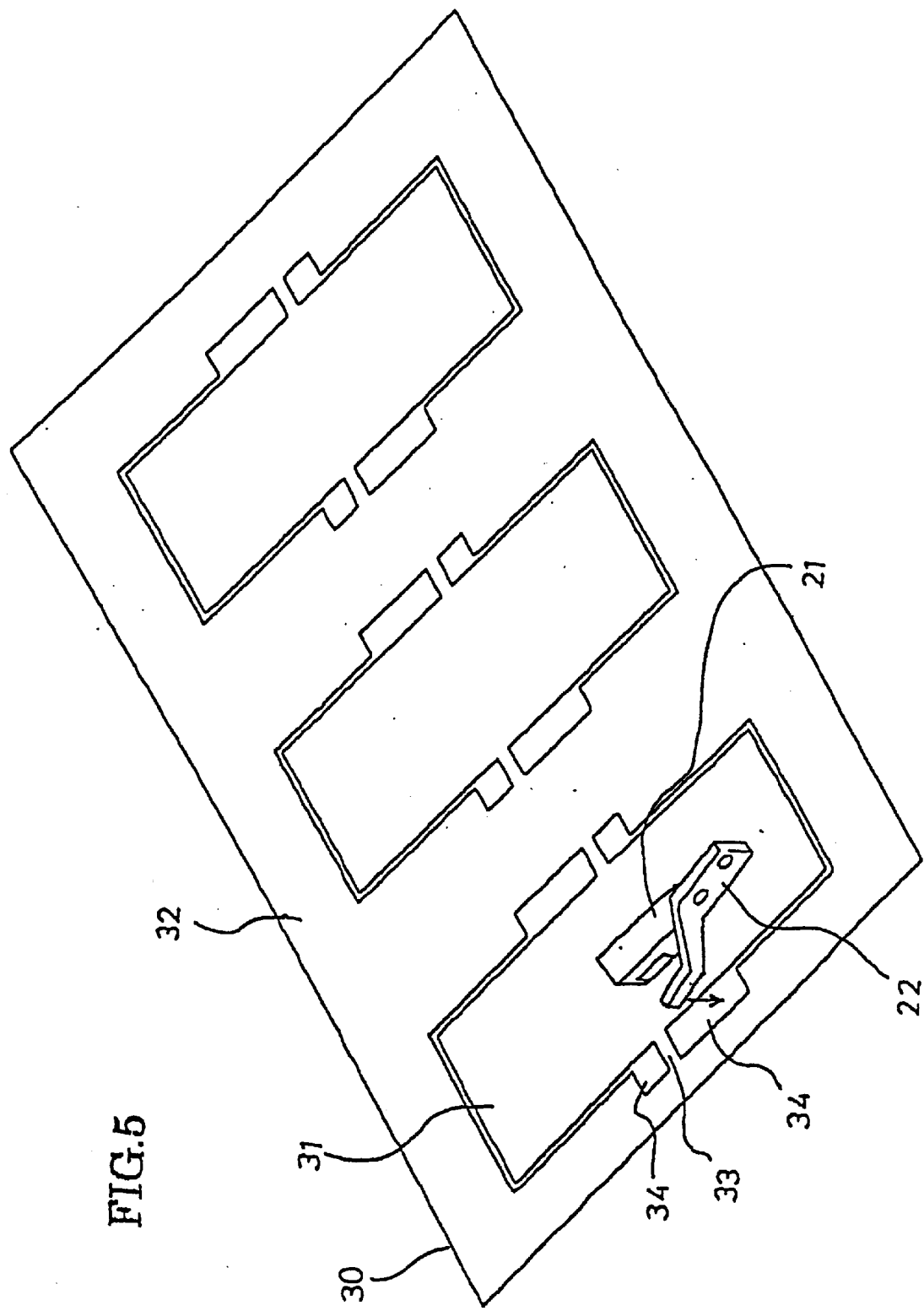
FIG. 5 is a diagram for explaining an operation of cutting out a target shape portion from the worked metal sheet shown in FIG. 3, in which a movable blade member of the target shape portion cutting apparatus is in a position just to start entering a tool insertion hole formed in the metal sheet.

FIG. 5 shows the state where the distal end of the movable blade member 22 of the target shape portion cutting apparatus 1 just starts entering the tool insertion hole 34 of the worked metal sheet 30.

Figure 6:
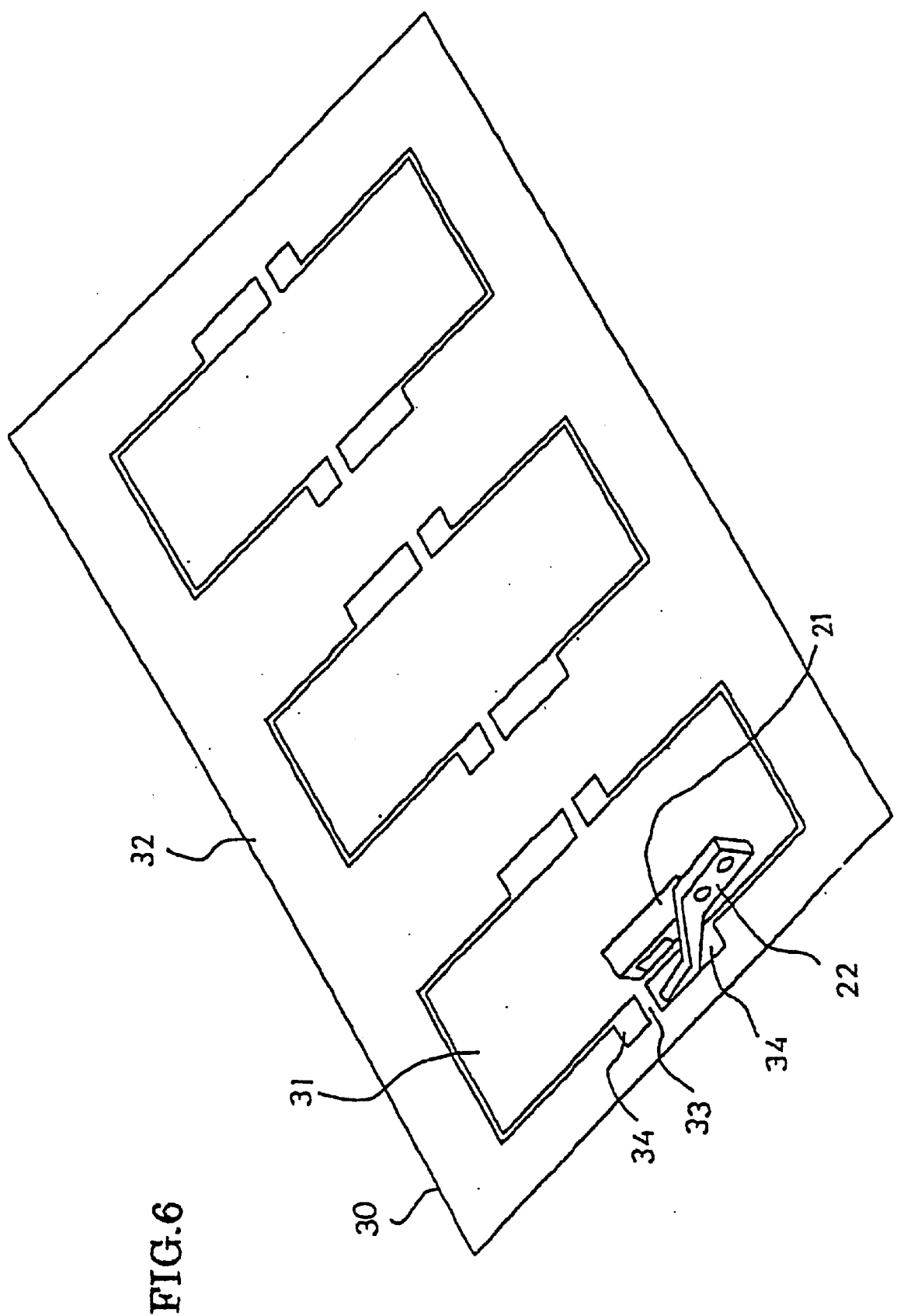
FIG. 6 is a diagram showing the movable blade member inserted in the tool insertion hole from the position in FIG. 5.

FIG. 6 shows the state where the distal end of the movable blade member 22 is inserted into the tool insertion hole 34 while being open with respect to the fixed blade member 21. The state where the movable blade member 22 is open with respect to the fixed blade member 21 can be detected by the dog 14 and the proximity switch 15a.

The worked metal sheet 30 is securely placed on the top surface of the mounting section 27 made of a soft material such as brush or sponge rubber. This allows the second blade 22a of the movable blade member 22 to pass through the tool insertion hole 34 of the metal sheet 30 and go further down below the bottom surface of the joint portion 33 while deforming the brush, sponge rubber or the like of the mounting section 27.

The target shape portion cutting apparatus 1 whose movable blade member 22 is positioned in the tool insertion hole 34 as shown in FIG. 6 is moved in the widthwise direction of the metal sheet 30 toward the joint portion 33. During the movement of the target shape portion cutting apparatus 1, the movable blade member 22 slides on the mounting section 27.

The movement of the target shape portion cutting apparatus 1 causes one side of the movable blade member 22 to closely contact the side edge of the target shape portion 31. At the same time, the target shape portion cutting apparatus 1 presses the fixed blade member 21 and the pressing block 16 against the top surface of the target shape portion 31 so that the edge line of the first blade 21a of the fixed blade member 21 comes over the boundary line 35.

Figure 7:
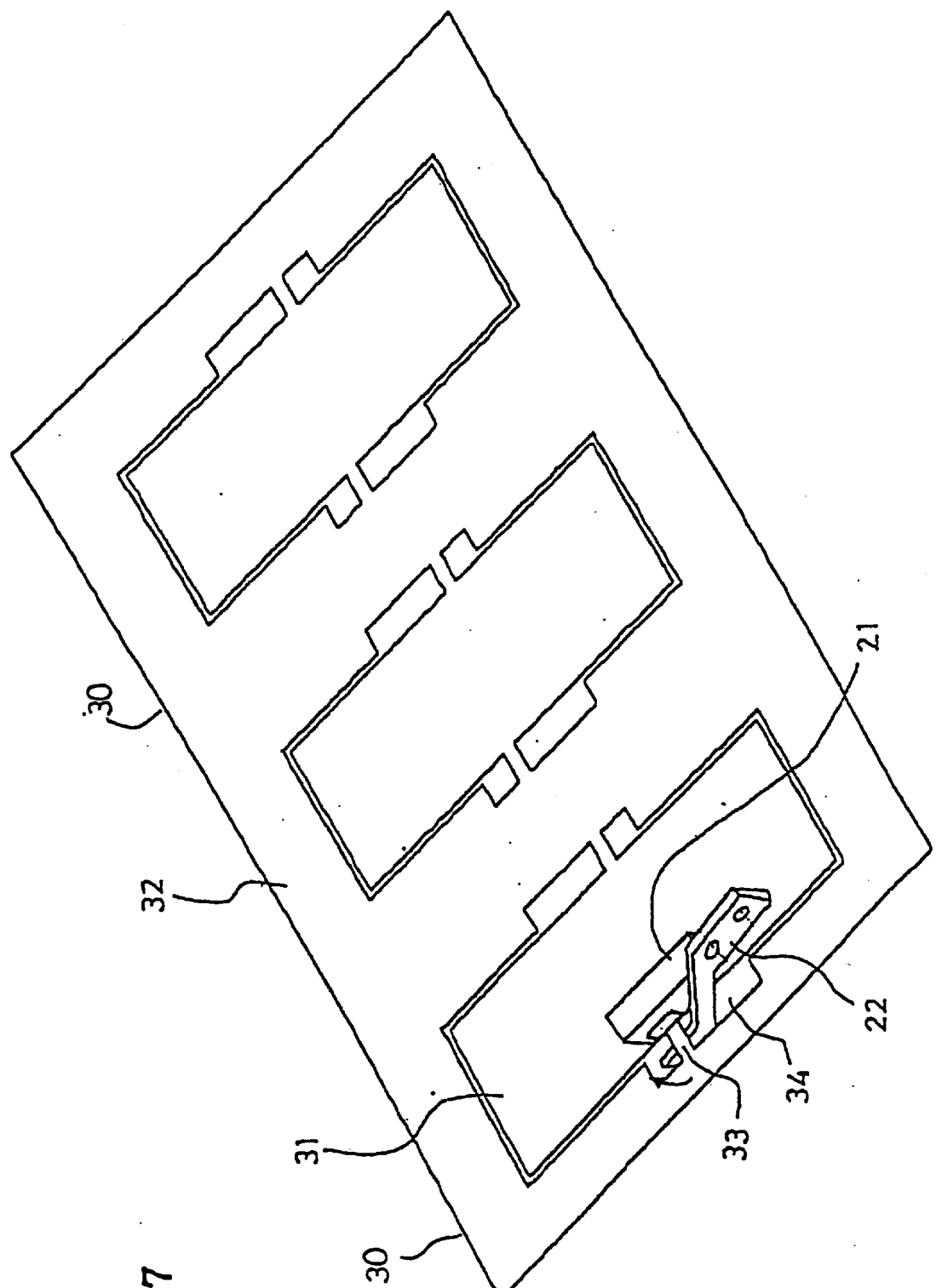
FIG. 7 is a diagram showing the movable blade member positioned ready to cut out a joint portion after moving from a position in FIG. 6 toward the joint portion.

This completes the positioning of the target shape portion cutting apparatus 1 with respect to the worked metal sheet 30. FIG. 7 shows the state in which the positioning is completed.

Figure 8:
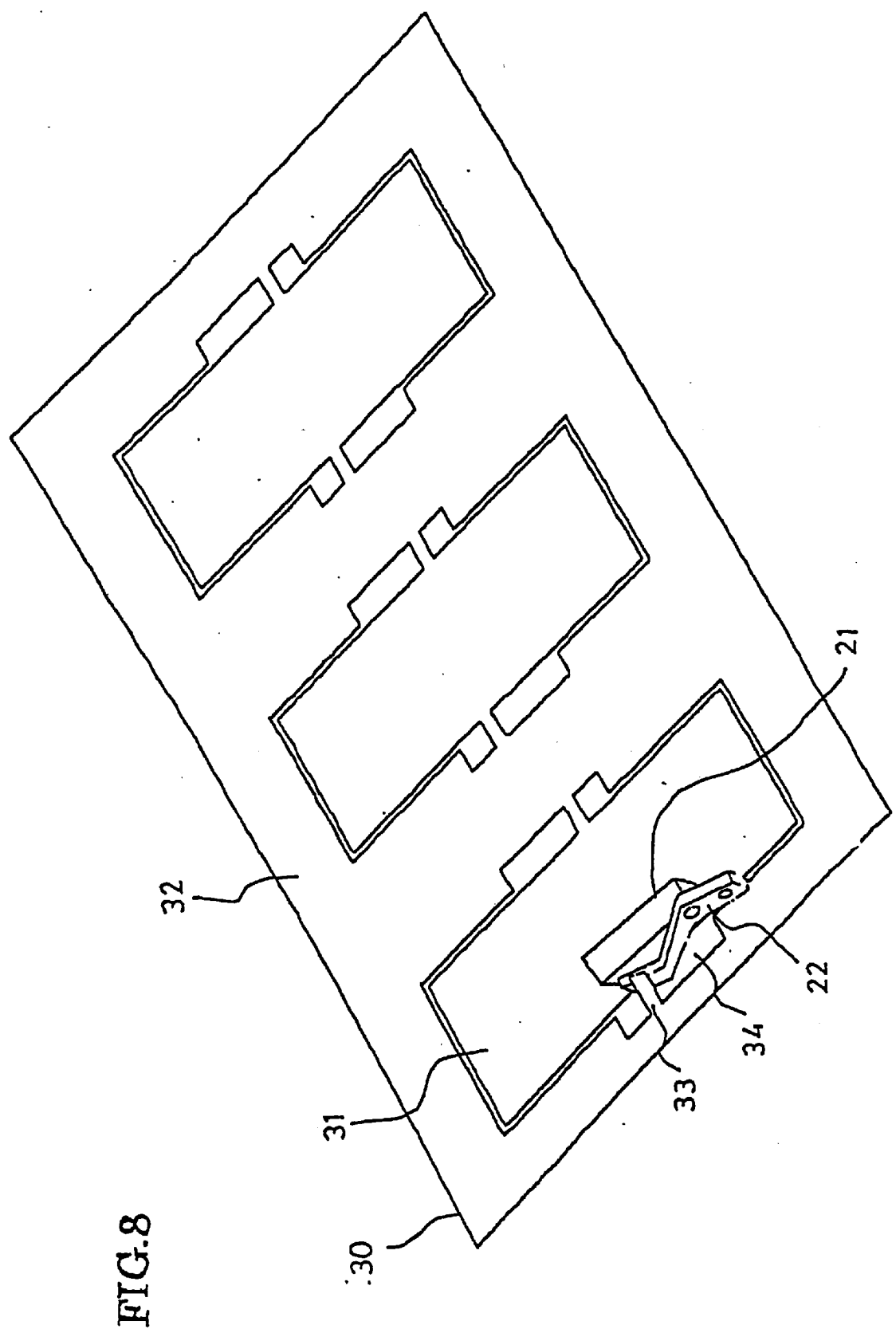
FIG. 8 is a diagram showing the movable blade member which has just sheared the joint portion after pivoting from the position in FIG. 7.

Next, the drive cylinder 12 of the target shape portion cutting apparatus 1 is driven to turn the movable blade member 22 at the position and in the posture shown in FIG. 7 around the pin 25 to engage the first blade 21a of the fixed blade member 21 with the second blade 22a of the movable blade member 22 and shear the joint portion 33 at the boundary line 35 between the joint portion 33 and the target shape portion 31, as shown in FIG. 8. As the target shape portion 31 is pressed by the fixed blade member 21 and the pressing block 16 while shearing the joint portion 33, the target shape portion 31 is not moved by this shearing operation (or by the rotation of the movable blade member 22). The rotation of the movable blade member 22 up to the last position or the complete engagement of the first blade 21a with the second blade 22a is detected and checked by the proximity switch 15b.

After shearing the joint portion 33, the movable blade member 22 rotates further upward and passes through a clearance between the end face of the cut joint portion 33 and the side end face of the target shape portion 31. Since the movable blade member 22 has a predetermined thickness (greater than the clearance) as mentioned above, however, the movable blade member 22 interferes with the joint portion 33 and bends the sheared-side end of the joint portion 33 upward as the movable blade member passes through the clearance.

Figure 9:
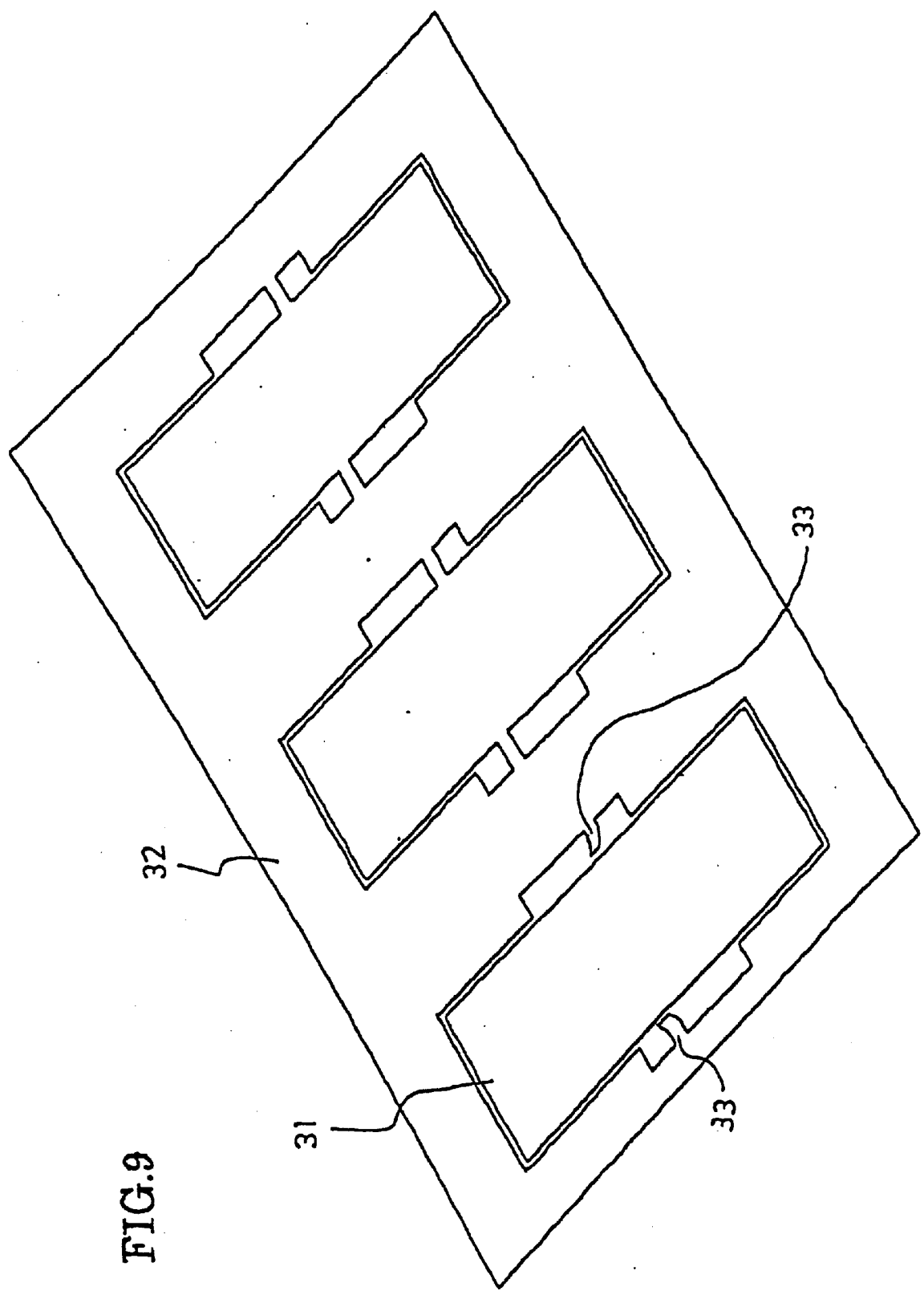
FIG. 9 is a diagram depicting the worked metal sheet with the joint portion sheared.

As a result, the joint portion 33 remaining on the side of the base metal sheet 32 is kept curved as shown in FIG. 9. Therefore, when picking up the target shape portion 31 in FIG. 9 to take out the target shape portion from the worked metal sheet 30, the target shape portion 31 does not interfere with the sheared-side end of the joint portion 33.

As described above, the second blade 22a of the movable blade member 22 moves in the direction of the thickness of the sheet relative to the first blade 21a of the fixed blade member 21 and cuts the joint portion 33 at the boundary line 35 between the joint portion 33 and the target shape portion 31, 50 that burrs do not occur on the sheared surface on the side of the target shape portion 31. In addition, when picking up and taking out the sheared target shape portion 31 after shearing of the joint portion 33, the target shape portion 31 does not contact the sheared joint portion 33. Further, during shearing of the joint portion 33, the position and posture of the target shape portion 31 do not change. Since the movable blade member 22 passes through the tool insertion hole 34 to deform the brush, sponge rubber or the like that constitutes the mounting section 27 on which the metal sheet 30 is placed, the brush, sponge rubber or the like is not cut with the forward movement and the rotation of the movable blade member 22.

According to the above-described embodiment, the work of cutting out a target shape portion (see FIG. 4) is carried out by a single robot to which tools, such as a hand for holding the metal sheet 30 and the target shape portion 31 and the target shape portion culling apparatus 1, are attached for the work. Alternatively, a plurality of robots may be used to individually perform the work of holding and carrying the metal sheet 30 and the target shape portion 31 and the work of cutting out the target shape portion 31.

In place of the pressing block 16, an adsorption pad may be used to adsorb and press the target shape portion 31 of the metal sheet 30, so that, after shearing of the joint portion 33, the target shape portion 31 adsorbed by the adsorption pad is taken out and conveyed to a predetermined position.

Figures 10A, 10B:
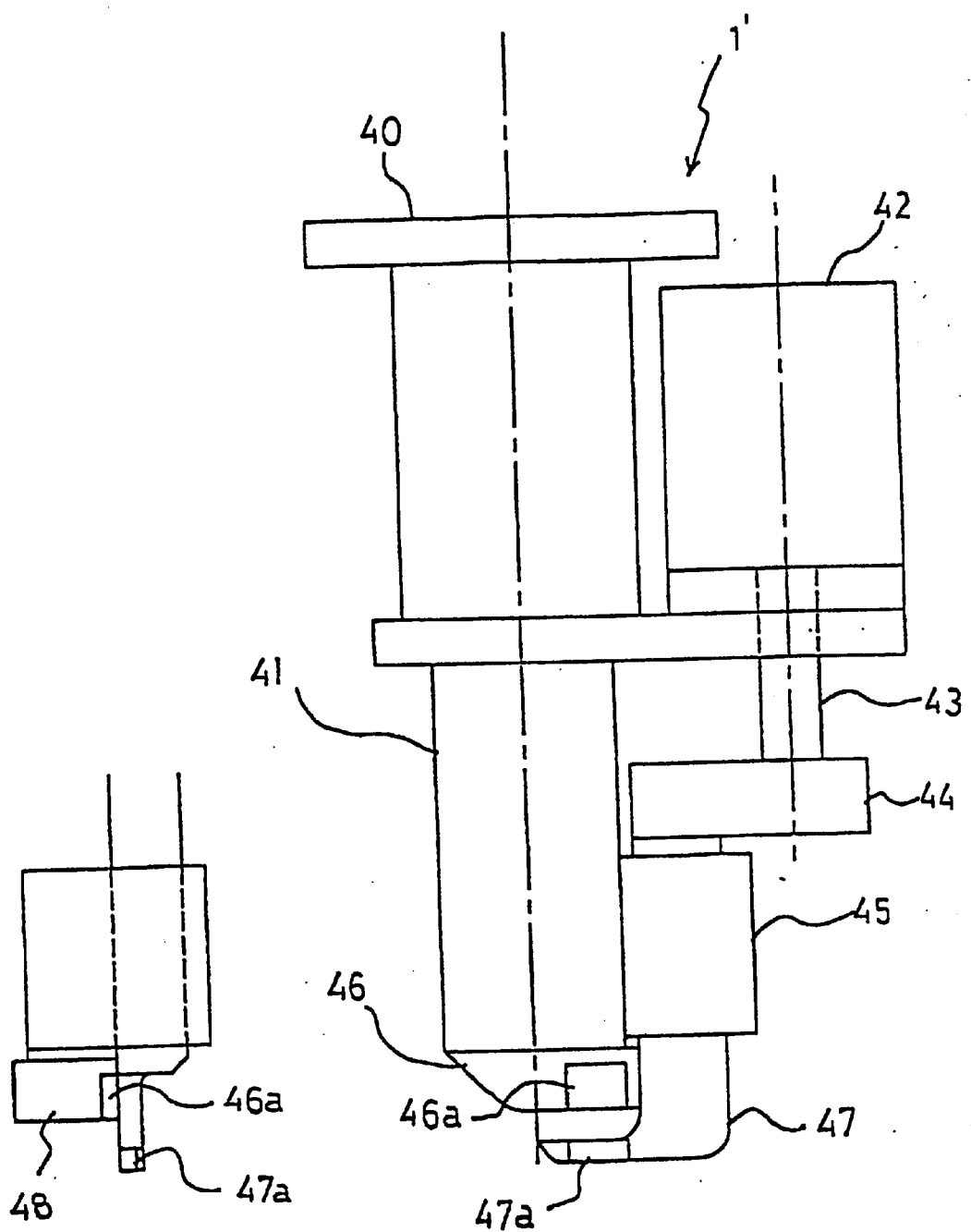
FIG. 10A is a side view of a target shape portion cutting apparatus according to a second embodiment of the present invention in which a second blade is open with respect to a first blade.
FIG. 10B is a partly enlarged view (front view) of the target shape portion cutting apparatus in FIG. 10A.

A target shape portion cutting apparatus 1' according to the second embodiment of the present invention will be discussed below with reference to FIGS. 10A, 10B and 11.

According to the embodiment, the second blade or the movable blade moves (up and down) while maintaining its posture with respect to the first blade or the fixed blade, so that the joint portion 33 between the target shape portion 31 and the base metal sheet 32 in the worked metal sheet is sheared.

The target shape portion cutting apparatus 1' has an attachment member 40 and a tool frame 41 secured to the attachment member 40. The attachment member 40 is used to attach the target shape portion cutting apparatus 1' to the automatic tool changer 8 shown in FIG. 1.

A drive cylinder 42 is attached to the tool frame 41. A fixed blade member 46 is attached to the lower end of the tool frame 41. A movable blade member 47 is attached to a rod 43 of the drive cylinder 42 via a link member 44. A first blade 46a as a fixed blade is attached to the fixed blade member 46, and a second blade 47a as a movable blade is attached to the movable blade member 47.

When the drive cylinder 42 is actuated to move the rod 43 in the direction of the axial center, the movable blade member 47 moves in the up-and-down direction while being guided by a guide 45 provided on the tool frame 41. FIG. 10A (and FIG. 10B being an enlarged view of FIG. 10A) shows the state where the rod 43 of the drive cylinder 42 moves downward so that the movable blade member 47 (second blade 47a) is open with respect to the fixed blade member 46 (first blade 46a). FIG. 11 shows the state where the movable blade member 47 (second blade 47a) is closed (engaged) with respect to the fixed blade member 46 (first blade 46a).

A pressing block 48 which presses a target shape portion formed on a metal sheet from above is secured to the side of the tool frame 41 opposite the side where the fixed blade member 46 is securely attached.

The work of cutting the joint portion 33 in the worked metal sheet 30 shown in FIG. 3 using the target shape portion cutting apparatus 1' of the embodiment is almost the same as the work of cutting the joint portion 33 using the target shape portion cutting apparatus 1 of the first embodiment as explained above. The procedures of the work will be discussed below.

The target shape portion cutting apparatus 1' is attached to the robot 2. With the second blade 47a set open with respect to the first blade 46a as shown in FIG. 10, the distal end of the movable blade member 47 is inserted in to the tool insertion hole 34 of the worked metal sheet 30.

The target shape portion cutting apparatus 1' is moved forward to the position where the first blade 46a and the second blade 47a sandwich the joint portion 33 from above and below.

One side face of the movable blade member 47 is positioned in close contact with the associated side end face of the target shape portion 31 in the metal sheet 30. At the same time, the fixed blade member 46 and the pressing block 48 are pressed against the top surface of the target shape portion 31 in such a way that the edge line of the first blade 46a of the fixed blade member 46 comes over the boundary line 35 between the joint portion 33 and the target shape portion 31.

Figure 11:
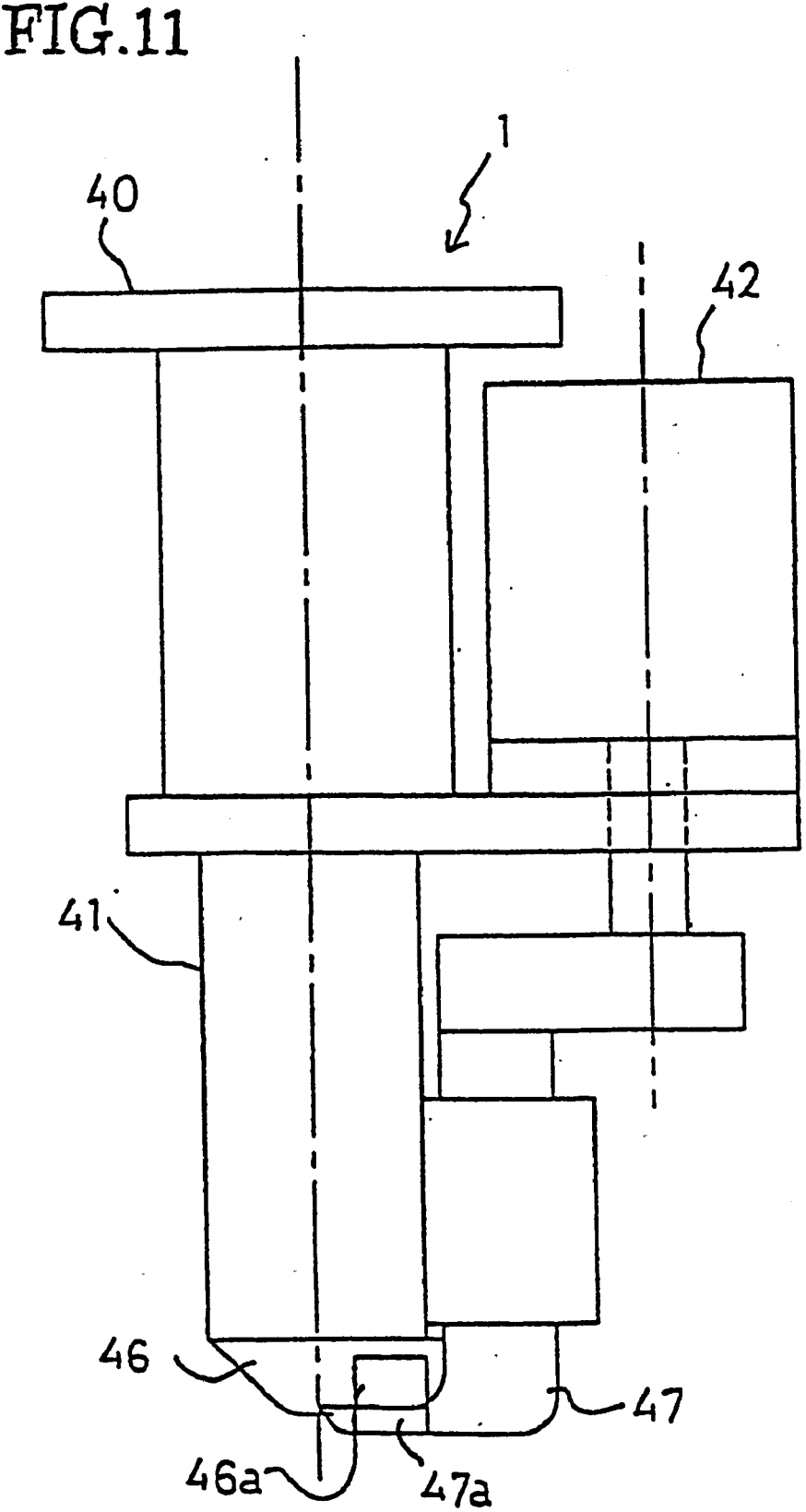
FIG. 11 is a side view of the target shape portion cutting apparatus in FIG. 10A in which the second blade is closed with respect to the first blade.

The drive cylinder 42 is actuated to lift the movable blade member 47 above with respect to the fixed blade member 46 as shown in FIG. 11, so that the joint portion 33 is sheared at the boundary line 35 by the cooperation of the first blade 46a and the second blade 47a.

As shearing of the joint portion 33 using the target shape portion cuffing apparatus 1' of the second embodiment is executed by moving the second blade 47a of the fixed blade member 47 in the direction of the thickness of the metal sheet 30, in the same manner as in the shearing of the joint portion 33 using the target shape portion cutting apparatus 1 of the first embodiment, burrs do not occur on the sheared surface of the target shape portion 31. Since the movable blade member 47 has a predetermined thickness, the movable blade member 47 contacts the joint portion 33 and bends the sheared-side end of the joint portion 33 upward as the movable blade member shears the joint portion 33 and moves further upward, in the same way as in the case of the first embodiment. Therefore, when picking up and taking out the target shape portion 31 after shearing the joint portion 33, the target shape portion 31 does not interfere with the sheared joint portion 33. This facilitates the taking out operation of the target shape portion 31. During shearing of the joint portion 33, the target shape portion 31 is kept pressed by the fixed blade member 46 and the pressing block 48, thus preventing the target shape portion 31 from being moved by the shearing operation (the up and down movement of the movable blade member 47).

Since the movable blade member 47 passes through the tool insertion hole 34 to deform the brush, sponge rubber or the like that constitutes the mounting section 27 on which the metal sheet 30 is placed, the sponge rubber or the brush is not cut with the forward movement and the rotation of the movable blade member 47, in the same way as in the case of the first embodiment.

In short, as the target shape portion cutting apparatus according to the present invention shears a joint portion between the base metal sheet and the target shape portion in the direction of the thickness of the joint portion, burrs are not caused so that no post-processing is required.

Since the cut end face of the joint portion does not contact or interfere with the end face of the target shape portion after shearing of the joint portion, it is easy to take out the cut-out target shape portion. This facilitates the automation of the robot-based metal sheet working. Further, as the mounting section on which the metal sheet is placed is not cut by the shearing of the joint portion, longer service life of the mounting section can be expected. Further, as the target shape portion, even when it has been cut out, staying on the mounting section without dropping below, it becomes easier to collect and align individual target shape portions. In addition, it is easy to automatically collect and align individual base metal sheets from which target shape portions have been cut out.

What is claimed is:

1. A target shape portion cutting apparatus for cutting a target shape portion from a metal sheet, wherein the target shape portion is connected to the metal sheet through at least one joint portion at a boundary portion, and wherein a hole is formed at a region adjacent to each at least one joint portion, comprising:
   a mounting section for receiving the metal sheet thereon;
   a first member having a block and a first fixed blade for pressing from one face of said metal sheet on a side of said boundary portion against said mounting section; and
   a second member having a second movable blade which is received by the hole and approaches the at least one joint portion from an opposite face of the metal sheet and, in association with said first blade, in a thickness direction of the metal sheet, shears the metal sheet at said boundary portion to thereby cut said at least one joint portion.

2. The target shape portion cutting apparatus according to claim 1, wherein said second member is supported rotatably relative to said first member and is driven by a cylinder or a motor.

3. The target shape portion cutting apparatus according to claim 1, wherein said second member is moved by a cylinder or a motor in said thickness direction of said metal sheet.

4. The target shape portion cutting apparatus according to claim 1, wherein said second member is thick enough to bend the at least one joint portion by pushing when cutting said at least one joint portion.

5. The target shape portion cutting apparatus according to claim 2, wherein said second member is thick enough to bend the at least one joint portion by pushing when cutting said at least one joint portion.

6. The target shape portion cutting apparatus according to claim 3, wherein said second member is thick enough to bend the at least one joint portion by pushing when cutting said at least one joint portion.

7. A robot mounting a target shape portion cutting apparatus for cutting a target shape portion from a metal sheet, wherein the target shape portion is connected to the metal sheet through at least one joint portion at a boundary portion, and wherein a hole is formed at a region adjacent to each at least one joint portion, said target shape portion cutting apparatus comprising:
   a mounting section for receiving the metal sheet thereon:
   a first member having a block and a first fixed blade for pressing from one face of said metal sheet on a side of said boundary portion against said mounting section; and
   a second member having a second movable blade which is received by the hole and approaches the at least one joint portion from an opposite face of the metal sheet and, in association with said first blade, in a thickness direction of the metal sheet, shears the metal sheet at said boundary portion to thereby cut said at least one joint portion.

8. The robot according to claim 7, wherein said second member is supported rotatably relative to said first member and is driven by a cylinder or a motor.

9. The robot according to claim 7, wherein said second member is moved by a cylinder or a motor in the thickness direction of said metal sheet.

10. A The robot according to claim 7, wherein said second member is thick enough to bend the at least one joint portion by pushing when cutting said at least one joint portion.

11. The robot according to claim 8, wherein said second member is thick enough to bend the at least one joint portion by pushing when cutting said at least one joint portion.

12. The robot according to claim 9, wherein said second member is thick enough to bend the at least one joint portion by pushing when cutting said at least one joint portion.

13. A method of cutting a target shape portion off at least one joint portion in a metal sheet, using a target shape portion cutting apparatus, wherein the target shape portion is connected to the metal sheet through the at least one joint portion at a boundary portion, and wherein a hole is formed at a region adjacent to each at least one joint portion, said target shape portion cutting apparatus comprising:
   a first member having a block for pressing from one face of said metal sheet and from a side of said boundary portion against said mounting section, and a first blade; and
   a second member having a second blade which approaches the at least one joint portion from an opposite face of the metal sheet and, in association with said first blade, in a thickness direction of the metal sheet, shears the metal sheet at said boundary portion to thereby cut said target shape portion off the at least one joint portion, and the method comprising:
   placing the metal sheet, where each said hole is formed, on an upper surface of a mounting section which is made of a depressible material that can maintain a plane posture of said target shape portion and said metal sheet;
   inserting said second member of said target shape portion cutting apparatus into each hole and depressing said upper surface of said mounting section with said second member;
   moving said target shape portion cutting apparatus to a position where said first blade and said second blade are above and below the boundary portion, while depressing said mounting section with said second member;
   pressing the first member against said boundary portion; and
   moving said second blade upward with respect to said first blade to thereby cut the at least one joint portion at the boundary portion by a shearing action.

14. The method according to claim 13, wherein said target shape portion cutting apparatus is mounted on a robot and said method of cutting a target shape portion off the at least one joint portion is executed by an operation of the robot.

15. An apparatus for cutting a target shape portion from a metal sheet by shearing at least one joint portion at a region bordering on the target shape portion, said metal sheet being formed with said target shape portion, a remaining portion surrounding said target shape portion and the at least one joint portion joining said target shape portion with said remaining portion, said apparatus comprising:

- a depressible mounting section for receiving the metal sheet thereon;
- a first member for pressing the at least one joint portion from above;
- a second member movable to a position below the at least one joint portion while depressing the mounting section;
- said second member being rotatable or linearly movable with respect to said first member and having a blade having a predetermined width and also a predetermined length equal to or longer than the width of the at least one joint portion,
- said first member having a block for pressing the at least one joint portion toward the mounting section, and a fixed blade with a length equal to or longer than the width of the joint portion,
- whereby, said apparatus, while being placed at a fixed position, rotates or linearly moves said movable blade member with respect to said fixed blade member, thereby shearing the at least one joint portion at the region and bending a sheared-side end of the sheared at least one joint portion upward.

\* \* \* \* \*

UNITED STATES PATENT AND TRADEMARK OFFICE
CERTIFICATE OF CORRECTION

PATENT NO. : 6,729,214 B2
DATED : May 4, 2004
INVENTOR(S) : Kazuhisa Otsuka et al.

It is certified that error appears in the above-identified patent and that said Letters Patent is hereby corrected as shown below:

Column 7,
Line 9, please change "50" to -- so --.
Line 27, please change "culling" to -- cutting --.

Column 8,
Line 35, please change "cuffing" to -- cutting --.

Column 10,
Lines 16, 23 and 25, please change "cuffing" to -- cutting --.

Signed and Sealed this

Twenty-eighth Day of December, 2004

JON W. DUDAS
*Director of the United States Patent and Trademark Office*